United States Patent
Bezryadin

(10) Patent No.: US 8,116,562 B2
(45) Date of Patent: Feb. 14, 2012

(54) IMAGE PROCESSING INCLUDING, BUT NOT LIMITED TO, LOGARITHIMIC CODING IN COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES

(75) Inventor: Sergey N. Bezryadin, San Francisco, CA (US)

(73) Assignee: KWE International, Inc., South San Francisco, CA (US)

( * ) Notice: Subject to any disclaimer, the term of this patent is extended or adjusted under 35 U.S.C. 154(b) by 0 days.

(21) Appl. No.: 13/044,998

(22) Filed: Mar. 10, 2011

(65) Prior Publication Data

US 2011/0158526 A1 Jun. 30, 2011

Related U.S. Application Data

(63) Continuation of application No. 11/564,730, filed on Nov. 29, 2006, now Pat. No. 7,929,753.

(51) Int. Cl.
*G06K 9/00* (2006.01)
*G06K 9/40* (2006.01)
*G06K 9/36* (2006.01)
*G06K 9/03* (2006.01)
G09G 5/02 (2006.01)
H04N 5/00 (2006.01)

(52) U.S. Cl. ........ 382/162; 382/254; 382/276; 382/309; 345/591; 348/612

(58) Field of Classification Search .................. 382/162, 382/254, 276, 309; 345/591
See application file for complete search history.

(56) References Cited

U.S. PATENT DOCUMENTS

| 6,178,269 | B1 | 1/2001 | Acharya |
| 6,934,411 | B2 | 8/2005 | Bezryadin |
| 6,941,331 | B2 | 9/2005 | Bezryadin et al. |
| 7,031,404 | B2 | 4/2006 | Lindquist |
| 2004/0143380 | A1 | 7/2004 | Stam et al. |

OTHER PUBLICATIONS

U.S. Appl. No. 11/377,591, filed Mar. 16, 2006, entitled "Editing (Including Saturation Editing) of Digital Color Images,".
U.S. Appl. No. 11/494,393, filed Jul. 26, 2006, entitled "Editing of Digital Images, Including (But Not Limited to) Highlighting and Shadowing of Image Areas,".

(Continued)

*Primary Examiner* — Brian Q Le
*Assistant Examiner* — Jose M Torres
(74) *Attorney, Agent, or Firm* — Haynes and Boone, LLP

(57) ABSTRACT

Color is edited using a color representation including digital values B (brightness), e and f such that $B=\sqrt{D^2+E^2+F^2}$, $e=E/B$, $f=F/B$, where DEF is a linear color coordinate system. Alternatively, color is represented using digital values B, C (chroma) and H (hue), where $\cos C=D/B$ and $\tan H=E/F$. Brightness can be changed without a color shift by changing the B coordinate and leaving unchanged the other coordinates e and f or C and H. Other features are also provided. Brightness coding methods are provided to reduced the size of image data for storage and/or network transmission. The coding methods include logarithmic coding. Some embodiments use logarithmic or linear coding depending on the brightness at a particular pixel.

20 Claims, 2 Drawing Sheets

OTHER PUBLICATIONS

U.S. Appl. No. 11/432,221, filed May 10, 2006, entitled "Editing of Digital Images, Including (But Not Limited to) Color-To-Monochromatic Conversion and Changing the Color of Monochromatic Image,".

U.S. Appl. No. 11/322,111, filed Dec. 28, 2005, entitled "Color Coordinate Systems Including Systems with a Coordinate Defined by a Square Root of a Quadratic Polynomial in Tristimulus Values and, Possibly, by a Sign of a Function of One or More of Tristimulus Values,".

U.S. Appl. No. 11/321,443, filed Dec. 28, 2005, entitled "Color Editing (Including Brightness Editing) Using Color Coordinate Systems Including Systems With a Coordinate Defined by a Square Root of a Quadratic Polynomial in Tristimulus Values and, Possibly, by a Sign of a Function of One or More of Tristimulus Values,".

U.S. Appl. No. 11/377,161, filed Mar. 16, 2006, entitled "Editing (Including Contrast and Sharpness Editing) of Digital Images,".

U.S. Appl. No. 11/376,837, filed Mar. 16, 2006, entitled "Editing (Including Hue Editing) of Digital Color Images,".

MacAdam, "Orthogonal Color Matching Functions", Journal of the Optical Society of America, 1954, vol. 44, pp. 713-724.

Cohen, Jozef "Two Preferred Reference Frames in Fundamental Color Space" Visual Color and Color Mixture: The Fundamental Color Space, Huguette Cohen, 2001, pp. 94-95, 100-103.

Pratt, William K., "Digital Image Processing—PIKS Inside ($3^{rd}$ Edition)" John Wiley & Sons, Inc. 2001, pp. 189-210.

Xu, Ruifeng; Pattanaik, Sumanta N.; Hughes, Charles E. "High-Dynamic-Range Still-Image Encoding in JPEG 2000" IEEE Computer Society, IEEE Computer Graphics and Applications 2005, p. 69-76.

Otim, Stephen O.; Jospeh, Dileepan; Choubey, Bhaskar; Collins, Steven "Modelling of High Dynamic Range Logarithmic Como, Image Sensors" IMTC 2004—Instrumentation and Measurement Technology Conference, CMOS, Italy, May 18-20, 2004.

G. Yourganov, W. Stuerzlinger "Tone-Mapping for High Dynamic Range Images" Technical Report, Department of Computer Science, York University, Dec. 2001.

Spaulding, Kevin E.; Woolfe, Geoffrey J.; Giorgianni, Edward J. "Reference Input/Output Medium Metric RGB Color Encodings (RIMM/ROMM RGB)" PICS 2000 Conference, Mar. 26-29, 2000, Portland Oregon.

Larson, Gregory Ward "The LogLuv Encoding for Full Gamut, High Dynamic Range Images," Silicon Graphics, Inc., no later than Nov. 2, 2006.

Mantiuk, Rafal; Myszkowski, Karol; Seidel, Hans-Peter "Lossy Compression of High Dynamic Range Images and Video" MPI INformatik, Stuhlsatzenhausweb 85, 66123 Saarbrucken, Germany, Jan. 2006.

Ward, Greg "High Dynamic Range Image Encodings", no later than Dec. 21, 2005.

"Image Compression" Wikipedia, the free encyclopedia, no later than Oct. 20, 2006.

"Quadrature Mirror Filters" Digital Signal Processing, EECE, UBC, pp. 46-56, no later than Oct. 20, 2006.

Morse, Bryan "Some Important Properties of Human Vision—CS450: Introduction to Digital Signal and Image Processing" BYU Computer Science, no later than Oct. 17, 2006.

Choo, Shuo-yen and Chew, Gregory "JPEG 2000 and Wavelet Compression" EE362 Stanford University, pp. 1-18, no later than Feb. 26, 2007.

Ward, Greg "High Dynamic Range Imaging", May 21, 2001.

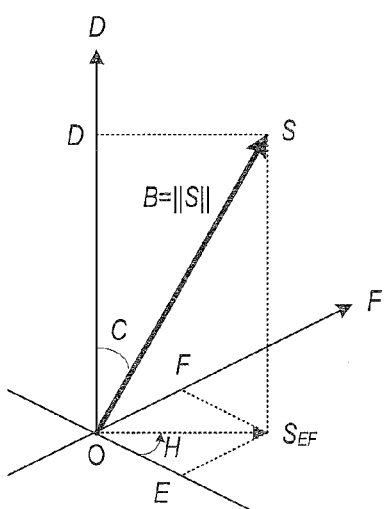
FIG. 3
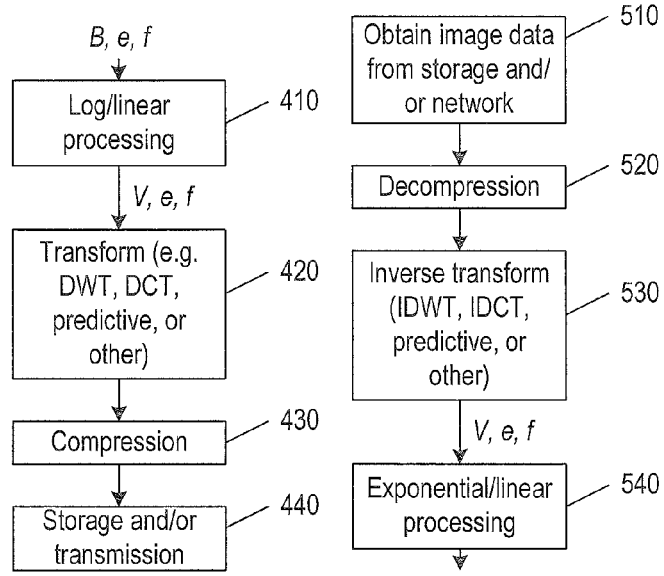
FIG. 4
FIG. 5
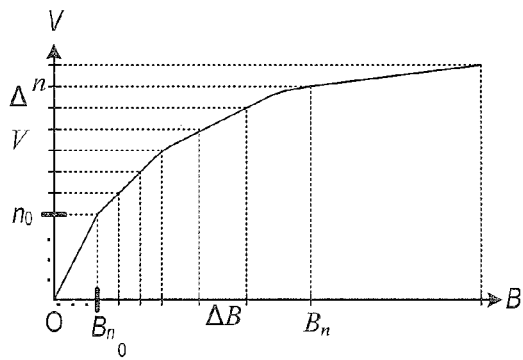
FIG. 6
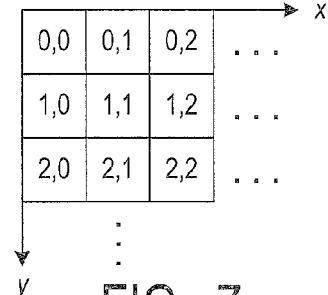
FIG. 7
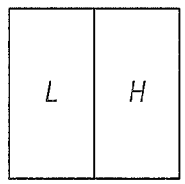
FIG. 8
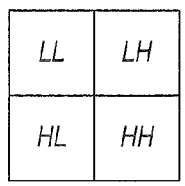
FIG. 9
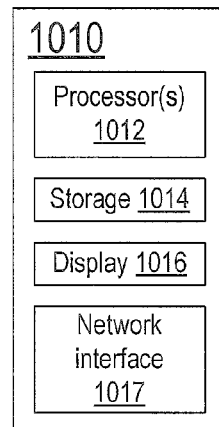
FIG. 10

IMAGE PROCESSING INCLUDING, BUT NOT LIMITED TO, LOGARITHIMIC CODING IN COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES

CROSS REFERENCE TO RELATED APPLICATIONS

The present application is a continuation of U.S. patent application Ser. No. 11/564,730 filed Nov. 29, 2006 now U.S. Pat. No. 7,929,753, incorporated herein by reference.

BACKGROUND OF THE INVENTION

The present invention relates to digital representation, processing, storage and transmission of color images. A digital representation of an image can be stored in a storage device (e.g. a computer memory, a digital video recorder, or some other device). Such representation can be transmitted over a network, and can be used to display the color image on a computer monitor, a television screen, a printer, or some other device. The image can be edited using a suitable computer program. A monochromatic image is also a color image (of a single color displayed possibly at different intensities).

Color is a sensation caused by electromagnetic radiation (light) entering a human eye. The light causing the color sensation is called "color stimulus". Color depends on the radiant power and spectral composition of the color stimulus, but different stimuli can cause the same color sensation. Therefore, a large number of colors can be reproduced ("matched") by mixing just three "primary" color stimuli, e.g. a Red, a Blue and a Green. The primary stimuli can be produced by three "primary" light beams which, when mixed and reflected from an ideal diffuse surface, produce a desired color. The color can be represented by its coordinates, which specify the intensities of the primary light beams. For example, in linear RGB color coordinate systems, a color S is represented by coordinates R, G, B which define the intensities of the respective Red, Green and Blue primary light beams needed to match the color S. If $P(\lambda)$ is the radiance (i.e. the energy per unit of time per unit wavelength) of a light source generating the color S, then the RGB coordinates can be computed as:

$R=\int_0^\infty P(\lambda)\bar{r}(\lambda)d\lambda$ $G=\int_0^\infty P(\lambda)\bar{g}(\lambda)d\lambda$ $B=\int_0^\infty P(\lambda)\bar{b}(\lambda)d\lambda$ (1)

where $\bar{r}(\lambda)$, $\bar{g}(\lambda)$, $\bar{b}(\lambda)$ are "color matching functions" (CMF's). For each fixed wavelength $\lambda$, the values $\bar{r}(\lambda)$, $\bar{g}(\lambda)$, $\bar{b}(\lambda)$ are respectively the R, G and B values needed to match color produced by a monochromatic light of the wavelength $\lambda$ of a unit radiance. The color matching functions are zero outside of the visible range of the $\lambda$ values, so the integration limits in (1) can be replaced with the limits of the visible range. The integrals in (1) can be replaced with sums if the radiance $P(\lambda)$ is specified as power at discrete wavelengths. FIG. 1 illustrates the color matching functions for the 1931 CIE RGB color coordinate system for a 2° field. (CIE stands for "Commission Internationale de l'Eclairage".) See D. Malacara, "Color Vision and Colorimetry: theory and applications" (2002), and Wyszecki & Stiles, "Color Science: concepts and Methods, Quantitative Data and Formulae" (2$^{nd}$ Ed. 2000), both incorporated herein by reference.

The RGB system of FIG. 1 is called linear because, as shown by equations (1), the R, G, and B values are linear in $P(\lambda)$. In a linear system, the intensities such as R, G, B are called "tristimulus values".

As seen from FIG. 1, the function $\bar{r}(\lambda)$ can be negative, so the R coordinate can be negative. If R is negative, this means that when the color S is mixed with |R| units of the Red primary, the resulting color matches the mixture of G units of the Green primary with B units of the Blue primary.

New linear color coordinate systems can be obtained as non-degenerate linear transformations of other systems. For example, the 1931 CIE XYZ color coordinate system for a 2° field is obtained from the CIE RGB system of FIG. 1 using the following transformation:

$$\begin{bmatrix} X \\ Y \\ Z \end{bmatrix} = A_{RGB-XYZ} \begin{bmatrix} R \\ G \\ B \end{bmatrix}$$ (2)

where:

$$A_{RGB-XYZ} = \frac{1}{0.17697} \begin{bmatrix} 0.49 & 0.31 & 0.20 \\ 0.17697 & 0.81240 & 0.01063 \\ 0.00 & 0.01 & 0.99 \end{bmatrix}$$ (3)

This XYZ system does not correspond to real, physical primaries. The color matching functions $\bar{x}(\lambda)$, $\bar{y}(\lambda)$, $\bar{z}(\lambda)$ for this XYZ system are shown in FIG. 2. These color matching functions are defined by the same matrix $A_{RGB-XYZ}$:

$$\begin{bmatrix} \bar{x}(\lambda) \\ \bar{y}(\lambda) \\ \bar{z}(\lambda) \end{bmatrix} = A_{RGB-XYZ} \begin{bmatrix} \bar{r}(\lambda) \\ \bar{g}(\lambda) \\ \bar{b}(\lambda) \end{bmatrix}$$

The tristimulus values X, Y, Z can be computed from the color matching functions in the usual way:

$X=\int_0^\infty P(\lambda)\bar{x}(\lambda)d\lambda$ $Y=\int_0^\infty P(\lambda)\bar{y}(\lambda)d\lambda$ $Z=\int_0^\infty P(\lambda)\bar{z}(\lambda)d\lambda$ (4)

There are also non-linear color coordinate systems. One example is a non-linear sRGB system standardized by International Electrotechnical Commission (IEC) as IEC 61966-2-1. The sRGB coordinates can be converted to the XYZ coordinates (4) or the CIE ROB coordinates (1). Another example is HSB (Hue, Saturation, Brightness). The HSB system is based on sRGB. In the HSB system, the colors can be visualized as points of a vertical cylinder. The Hue coordinate is an angle on the cylinder's horizontal circular cross section. The pure Red color corresponds to Hue=0°; the pure Green to Hue=120°; the pure Blue to Hue=240°. The angles between 0° and 120° correspond to mixtures of the Red and the Green; the angles between 120° and 240° correspond to mixtures of the Green and the Blue; the angles between 240° and 360° correspond to mixtures of the Red and the Blue. The radial distance from the center indicates the color's Saturation, i.e. the amount of White (White means here that R=G=B). At the circumference, the Saturation is maximal, which means that the White amount is 0 (this means that at least one of the R, G, and B coordinates is 0). At the center, the Saturation is 0 because the center represents the White color (R=G=B). The Brightness is measured along the vertical axis of the cylinder, and is defined as max(R,G,B).

Different color coordinate systems are suitable for different purposes. For example, the sRGB system is convenient for rendering color on certain types of monitors which automatically convert the sRGB coordinates into color. The HSB system is convenient for some color editing operations including brightness adjustments.

Brightness can be thought of as a degree of intensity of a color stimulus. Brightness corresponds to our sensation of an object being "bright" or "dim". Brightness has been represented as the Y value of the XYZ system of FIG. 2, or as the maximum of the R, G and B coordinates of the sRGB coordinate system.

There is also an xyY coordinate system is defined based on the XYZ system as follows:

the Y coordinate of the xyY system is the same as the Y coordinate of the XYZ system;

$$x=X/(X+Y+Z);$$

$$z=Z/(X+Y+Z).$$

The values x and z are called chromaticity coordinates. Separate representation of the brightness coordinate and the chromaticity coordinates is helpful in providing a compact yet faithful image representation. People are more sensitive to brightness changes (and hence brightness distortion) than changes in hue and saturation. Therefore, one can represent the chromaticity coordinates less precisely but more compactly (e.g. in a fewer bits) than brightness.

Compact representation is a particular challenge for images with a high dynamic range (the dynamic range is defined as the ratio of the maximum to minimum brightness values, where the minimum brightness is chosen as some positive number). A large range of brightness can be represented compactly using a logarithmic function. See G. W. Larson, "The LogLuv Encoding for Full Gamut, High Dynamic Range Images", *J. Graphics Tools*, vol. 3, no. 1, pages 15-31. This article proposes a LogLuv coordinate system with a brightness coordinate $L_e$ and chromatic coordinates $u_e$, $v_e$ defined as follows:

$$L_e = \lfloor 256(\log_2 Y + 64) \rfloor$$

$$u_e = \lfloor 410 u' \rfloor$$

$$v_e = \lfloor 410 v' \rfloor \quad (5)$$

where:

$\lfloor \exp \rfloor$ is the floor operator, denoting the largest integer not exceeding the expression exp;

$$u'=4x/(-2x+12y+3)$$

$$v'=9y/(-2x+12y+3)$$

x, y, Y are as in the xyY system.

$L_e$ can be stored in 16 bits using sign/magnitude representation, and each of $u_e$, $v_e$ in 8 bits.

It is desirable to obtain color coordinate systems which facilitate brightness editing and other types of color editing, and which also allow compact representation of images.

SUMMARY

Some embodiments of the present invention provide color representation techniques using novel color coordinate systems. In some embodiments, one of the coordinates is defined by a square root of a quadratic polynomial in tristimulus values, e.g. by a value $B=T_1^2+T_2^2+T_3^2$ where $T_1$, $T_2$, $T_3$ are tristimulus values, or by the value B and the sign of one or more of $T_1$, $T_2$, $T_3$.

In some embodiments, the color coordinate system has the following coordinates:

$$B=\sqrt{T_1^2+T_2^2+T_3^2}$$

$$S_2=T_2/B$$

$$S_3=T_3/B$$

In this coordinate system, if the B coordinate is changed, e.g. multiplied by some number k, and $S_2$ and $S_3$ are unchanged, the color modification corresponds to multiplying the tristimulus values by k. Such color modification does not change the chromaticity coordinates $$T_1/(T_1+T_2+T_3), T_2/(T_1+T_2+T_3), T_3/(T_1+T_2+T_3).$$

Therefore, the (B, $S_2$, $S_3$) coordinate system facilitates color editing when it is desired not to change the chromaticity coordinates (so that no color shift would occur). Of note, the xyY system also allows changing only one coordinate Y without changing the chromaticity coordinates x, y. The xyY system differs from the (B, $S_2$, $S_3$) system in that the Y coordinate is a linear coordinate and is a tristimulus value, while the B coordinate is a non-linear function of tristimulus values (and of the power distribution P(λ)).

Linear transformations of such color coordinate systems can be used to obtain other novel color coordinate systems.

In some embodiments, compact representation of brightness is achieved using logarithmic coding. Some embodiments use logarithmic or linear coding depending on the brightness at a particular pixel.

The invention is not limited to the features and advantages described above. Other features are described below. The invention is defined by the appended claims.

BRIEF DESCRIPTION OF THE DRAWINGS

FIG. 3 illustrates some color coordinate systems according to some embodiments of the present invention.

FIGS. 4 and 5 are flow charts of image processing methods according to some embodiments of the present invention.

FIG. 6 is a graph illustrating brightness coding according to some embodiments of the present invention.

FIG. 7 shows pixel coordinates used in some embodiments of the present invention.

FIGS. 8, 9 show wavelet transform coefficients in some embodiments of the present invention.

FIG. 10 is a block diagram of a computer system suitable for some embodiments of the present invention.

DESCRIPTION OF SOME EMBODIMENTS

The embodiments described in this section illustrate but do not limit the invention. The invention is defined by the appended claims.

Some embodiments of the present invention use color coordinate systems BEF, Bef and BCH which can be defined, for example, as follows. First, a linear color coordinate sys tem DEF is defined as a linear transformation of the 1931 CIE XYZ color coordinate system of FIG. 2:

$$\begin{bmatrix} D \\ E \\ F \end{bmatrix} = A_{XYZ-DEF} \begin{bmatrix} X \\ Y \\ Z \end{bmatrix} \quad (6)$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \quad (7)$$

It has been found that for many computations, adequate results are achieved if the elements of matrix $A_{XYZ-DEF}$ are rounded to four digits or fewer after the decimal point, i.e. the matrix elements can be computed with an error Err≦0.00005. Larger errors can also be tolerated in some embodiments. The DEF coordinate system corresponds to color matching functions $\bar{d}(\lambda)$, $\bar{e}(\lambda)$, $\bar{f}(\lambda)$ which can be obtained from $\bar{x}(\lambda)$, $\bar{y}(\lambda)$, $\bar{z}(\lambda)$ using the same matrix $A_{XYZ-DEF}$:

$$\begin{bmatrix} \bar{d}(\lambda) \\ \bar{e}(\lambda) \\ \bar{f}(\lambda) \end{bmatrix} = A_{XYZ-DEF} \begin{bmatrix} \bar{x}(\lambda) \\ \bar{y}(\lambda) \\ \bar{z}(\lambda) \end{bmatrix} \quad (8)$$

By definition of the color matching functions and the tristimulus values, $$D = \int_0^\infty P(\lambda)\bar{d}(\lambda)d\lambda$$

$$E = \int_0^\infty P(\lambda)\bar{e}(\lambda)d\lambda$$

$$F = \int_0^\infty P(\lambda)\bar{f}(\lambda)d\lambda \quad (9)$$

As explained above, the integration can be performed over the visible range only.

Figure 1:
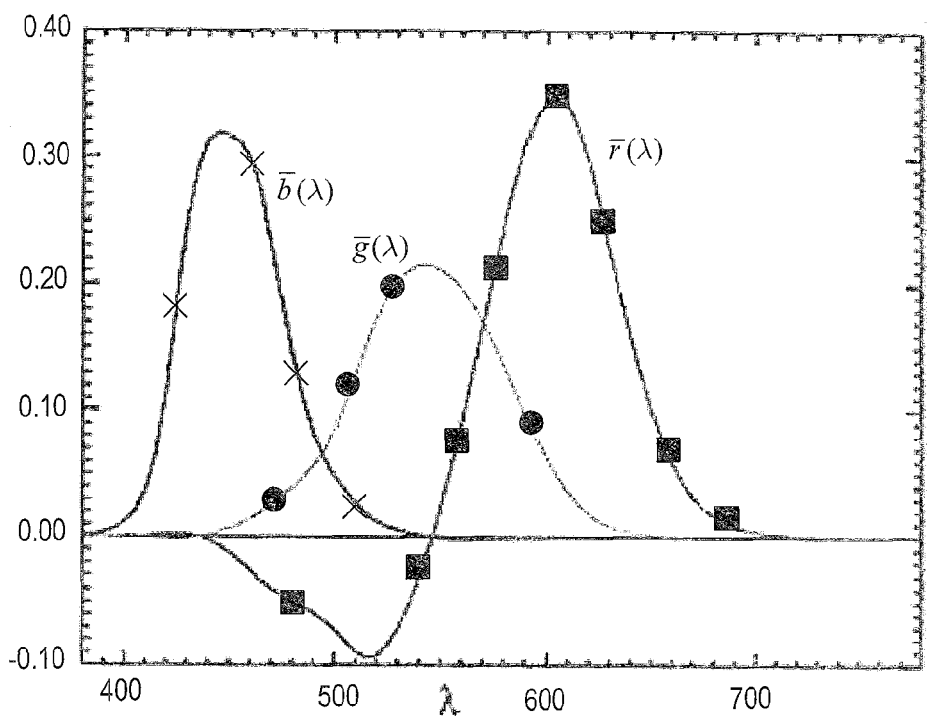
FIGS. 1 and 2 are graphs of color matching functions for prior art color coordinate systems.
Figure 2:
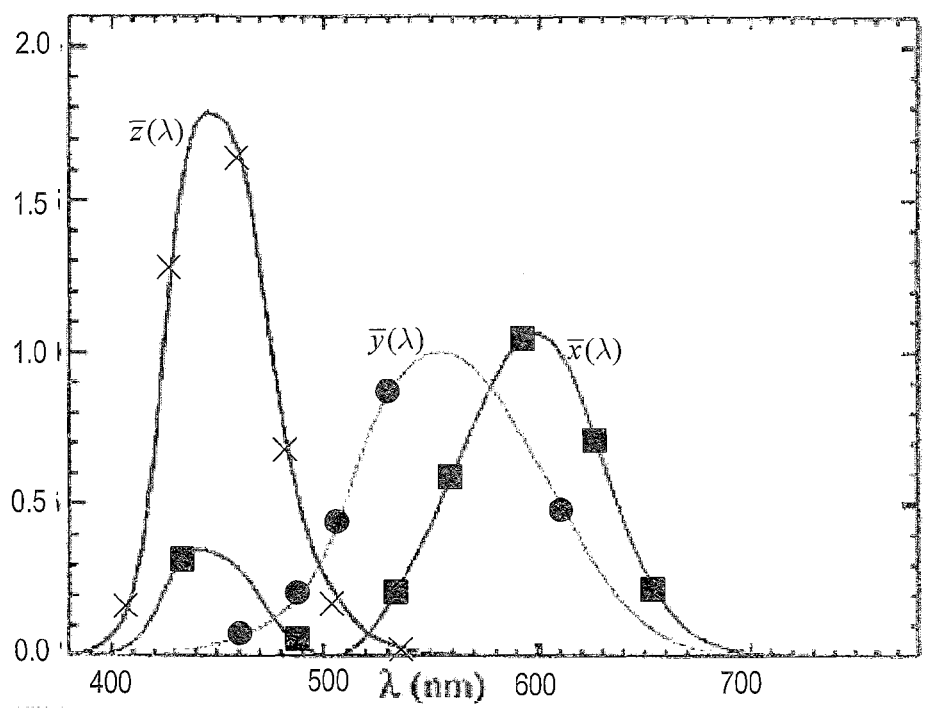

As seen in FIG. 2, the color matching functions $\bar{x}(\lambda)$, $\bar{y}(\lambda)$, $\bar{z}(\lambda)$ are never negative. It follows from equations (4) that the X, Y, Z values are never negative. Since the first row of matrix $A_{XYZ-DEF}$ has only positive coefficients, the function $\bar{d}(\lambda)$ is never negative, and the D value is also never negative.

When D>0 and E=F=0, the color is white or a shade of gray. Such colors coincide, up to a constant multiple, with the CIE $D_{65}$ white color standard.

If a color is produced by a monochromatic radiation with λ=700 nm (this is a red color), then F=0 and E>0.

The color matching functions $\bar{d}(\lambda)$, $\bar{e}(\lambda)$, $\bar{f}(\lambda)$ form an orthonormal system in the function space $L_2$ on $[0,\infty)$ (or on any interval containing the visible range of the λ values if the color matching functions are zero outside of this range), that is:

$$\int_0^\infty \bar{d}(\lambda)\bar{e}(\lambda)d\lambda = \int_0^\infty \bar{d}(\lambda)\bar{f}(\lambda)d\lambda = \int_0^\infty \bar{e}(\lambda)\bar{f}(\lambda)d\lambda = 0$$

$$\int_0^\infty [\bar{d}(\lambda)]^2 d\lambda = \int_0^\infty [\bar{e}(\lambda)]^2 d\lambda = \int_0^\infty [\bar{f}(\lambda)]^2 d\lambda = K \quad (10)$$

where K is a positive constant defined by the measurement units for the wavelength λ and the radiance P(λ). The units can be chosen so that K=1.

The integrals in (10) can be replaced with sums if the CMF's are defined at discrete λ values, i.e.:

$$\sum_\lambda \bar{d}(\lambda)\bar{e}(\lambda) = \sum_\lambda \bar{d}(\lambda)\bar{f}(\lambda) = \sum_\lambda \bar{e}(\lambda)\bar{f}(\lambda) = 0 \quad (11)$$

$$\sum_\lambda [\bar{d}(\lambda)]^2 = \sum_\lambda [\bar{e}(\lambda)]^2 = \sum_\lambda [\bar{f}(\lambda)]^2 = K.$$

where the sums are taken over a discrete set of the λ values. The constant K can be different than in (10). Color matching functions will be called orthonormal herein if the satisfy the equations (10) or (11).

If S1 and S2 are two colors with DEF coordinates (D1, E1, F1) and (D2, E2, F2), a dot product of these colors can be defined as follows:

$$<S1,S2> = D1*D2 + E1*E2 + F1*F2 \quad (12)$$

Thus, the DEF coordinate system can be thought of as a Cartesian coordinate system having mutually orthogonal axes D, E, F (FIG. 3), with the same measurement unit for each of these axes.

The dot product (12) does not depend on the color coordinate system as long as the color coordinate system is orthonormal in the sense of equations (10) or (11) and its CMF's are linear combinations of $\bar{x}(\lambda)$, $\bar{y}(\lambda)$, $\bar{z}(\lambda)$ (and hence of $\bar{d}(\lambda)$, $\bar{e}(\lambda)$, $\bar{f}(\lambda)$). More particularly, let $T_1$, $T_2$, $T_3$ be tristimulus values in a color coordinate system whose CMF's $\bar{t}_1$, $\bar{t}_2$, $\bar{t}_3$ belong to a linear span Span($\bar{d}(\lambda)$, $\bar{e}(\lambda)$, $\bar{f}(\lambda)$) and satisfy the conditions (10) or (11). For the case of equations (10), this means that:

$$\int_0^\infty \bar{t}_1(\lambda)\bar{t}_2(\lambda)d\lambda = \int_0^\infty \bar{t}_1(\lambda)\bar{t}_3(\lambda)d\lambda = \int_0^\infty \bar{t}_2(\lambda)\bar{t}_3(\lambda)d\lambda = 0$$

$$\int_0^\infty [\bar{t}_1(\lambda)]^2 d\lambda = \int_0^\infty [\bar{t}_2(\lambda)]^2 d\lambda = \int_0^\infty [\bar{t}_3(\lambda)]^2 d\lambda = K \quad (13)$$

with the same constant K as in (10). The discrete case (11) is similar. Suppose the colors S1, S2 have the $T_1 T_2 T_3$ coordinates $(T_{1.1}, T_{2.1}, T_{3.1})$ and $(T_{1.2}, T_{2.2}, T_{3.2})$ respectively. Then the dot product (12) is the same as $$<S_1,S_2> = T_{1.1}T_{1.2} + T_{2.1}T_{2.2} + T_{3.1}T_{3.2}.$$

The brightness B of a color S can be represented as the length (the norm) of the vector S:

$$B = \|S\| = \sqrt{<S,S>} = \sqrt{D^2 + E^2 + F^2} \quad (14)$$

The BEF color coordinate system defines each color by the coordinates (B, E, F). The Bef color coordinate system is defined as follows:

$$B = \sqrt{D^2 + E^2 + F^2}$$

$$e = E/B$$

$$f = F/B \quad (15)$$

If B=0 (absolute black color), then e and f can be left undefined or can be defined in any way, e.g. as zeroes.

Since D is never negative, the D, E, F values can be determined from the B, e, f values as follows:

$$E = e \times B$$

$$F = f \times B$$

$$D = \sqrt{B^2 - (e*B)^2 - (f*B)^2} = B\sqrt{1 - e^2 - f^2} \quad (16)$$

The Bef system is convenient for brightness editing because the brightness can be changed by changing the B coordinate and leaving e and f unchanged. Such editing does not involve a color shift, i.e. the color's chromatic perception does not change. See the following U.S. patent applications filed by S. N. Bezryadin and incorporated herein by reference: Ser. No. 11/321,443, filed Dec. 28, 2005; Ser. No. 11/322,111, filed Dec. 28, 2005; Ser. No. 11/432,221 filed May 10, 2006; Ser. No. 11/494,393 filed Jul. 26, 2006; Ser. No. 11/377,591 filed Mar. 16, 2006; Ser. No. 11/376,837 filed Mar. 16, 2006; and Ser. No. 11/377,161 filed Mar. 16, 2006.

Another color coordinate system that facilitates the brightness editing is the spherical coordinate system for the DEF space. This coordinate system BCH (Brightness, Chroma, Hue) is defined as follows (see also FIG. 3):

$$B=\sqrt{D^2+E^2+F^2} \quad (17)$$

C ("chroma") is the angle between the color S and the D axis;

H ("hue") is the angle between (i) the orthogonal projection $S_{EF}$ of the vector S on the EF plane and (ii) the E axis.

The term "chroma" has been used to represent a degree of saturation (see Malacara's book cited above). Recall that in the HSB system, the Saturation coordinate of a color represents the white amount in the color. In the BCH system, the C coordinate of a color is a good representation of saturation (and hence of chroma) because the C coordinate represents how much the color deviates from the white color $D_{65}$ represented by the D axis (E=F=0).

The H coordinate of the BCH system represents the angle between the projection $S_{EF}$ and the red color represented by the E axis, and thus the H coordinate is a good representation of hue.

Transformation from BCH to DEF can be performed as follows:

$$D=B\times\cos C$$

$$E=B\times\sin C\times\cos H$$

$$F=B\times\sin C\times\sin H \quad (18)$$

Transformation from DEF to BCH can be performed as follows. The B coordinate can be computed as in (17). The C and H computations depend on the range of these angles. Any suitable ranges can be chosen. In some embodiments, the angle C is in the range [0,π/2], and hence $$C=\cos^{-1}(D/B) \quad (19)$$

In some embodiments, the angle H can be computed from the relationship:

$$\tan H = F/E \quad (20)$$

or $$\tan H = f/e \quad (21)$$

where e and f are the Bef coordinates (15). For example, any of the following relations can be used:

$$H=\tan^{-1}(F/E)+\alpha$$

$$H=\tan^{-1}(f/e)+\alpha \quad (22)$$

where α depends on the range of H. In some embodiments, the angle H is measured from the positive direction of the E axis, and is in the range from 0 to 2π or −π to π. In some embodiments, one of the following computations is used:

$$H=\text{arctg}(E,F)$$

$$H=\text{arctg}(e,f) \quad (23)$$

where arctg is computed as shown in pseudocode in Appendix 1 at the end of this section before the claims.

Transformation from BCH to Bef can be performed as follows:

$$B=B$$

$$e=\sin C\times\cos H$$

$$f=\sin C\times\sin H \quad (24)$$

Transformation from Bef to BCH can be performed as follows:

$$B=B$$

$$C=\cos^{-1}\sqrt{1-e^2-f^2}, \text{ or } C=\sin^{-1}\sqrt{e^2+f^2}$$

$$H=\tan^{-1}(f/e)+\alpha \text{ (see (22)), or } H=\text{arctg}(e,f) \text{ (see Appendix 1)}. \quad (25)$$

As with Bef, the BCH system has the property that a change in the B coordinate without changing C and H corresponds to multiplying the tristimulus values D, E, F by some constant k.

The invention includes systems and methods for color image editing and display. The Bef and BCH color coordinates can be transmitted in a data carrier such as a wireless or wired network link, a computer readable disk, or other types of computer readable media. The invention includes computer instructions that program a computer system to perform the brightness editing and color coordinate system conversions. Some embodiments of the invention use hardwired circuitry instead of, or together with, software programmable circuitry.

In some embodiments, the Bef or BCH color coordinate system can be replaced with its linear transforms, e.g. the coordinates (B+e, e, f) or (2B, 2e, 2f) can be used instead of (B, e, f). The angle H can be measured from the E axis or some other position. The angle C can also be measured from some other position. The invention is not limited to the order of the coordinates. The invention is not limited to DEF, XYZ, or any other color coordinate system as the initial coordinate system. In some embodiments, the orthonormality conditions (10) or (11) are replaced with quasi-orthonormality conditions, i.e. the equations (10) or (11) hold only approximately. More particularly, CMF's $\bar{t}_1(\lambda)$, $\bar{t}_2(\lambda)$, $\bar{t}_3(\lambda)$ will be called herein quasi-orthonormal with an error at most ϵ if they satisfy the following conditions:

1. each of $\int_0^\infty \bar{t}_1(\lambda)\bar{t}_2(\lambda)d\lambda, \int_0^\infty \bar{t}_1(\lambda)\bar{t}_3(\lambda)d\lambda, \int_0^\infty \bar{t}_2(\lambda)\bar{t}_3(\lambda)d\lambda$, is in the interval [−ϵ,ϵ], and 2. each of $\int_0^\infty [\bar{t}_1(\lambda)]^2 d\lambda, \int_0^\infty [\bar{t}_2(\lambda)]^2 d\lambda, \int_0^\infty [\bar{t}_3(\lambda)]^2 d\lambda$, is in the interval [K−ϵ, K+ϵ]

for positive constants K and ϵ. In some embodiments, ϵ is 0.3K, or 0.1K, or some other value at most 0.3K, or some other value. Alternatively, the CMF's will be called quasi-orthonormal with an error at most E If they satisfy the following conditions:

1. each of $\sum_\lambda \bar{t}_1(\lambda)\bar{t}_2(\lambda), \sum_\lambda \bar{t}_1(\lambda)\bar{t}_3(\lambda),$ $\sum_\lambda \bar{t}_2(\lambda)\bar{t}_3(\lambda)$ is in the interval $[-\varepsilon, \varepsilon]$, and 2. each of $\sum_\lambda [\bar{t}_1(\lambda)]^2, \sum_\lambda [\bar{t}_2(\lambda)]^2,$ $\sum_\lambda [\bar{t}_3(\lambda)]^2$ is in the interval $[K - \varepsilon, K + \varepsilon]$ for positive constants K and $\epsilon$. In some embodiments, $\epsilon$ is 0.3K, or 0.1K, or some other value at most 0.3K, or some other value. Orthonormal functions are quasi-orthonormal, but the reverse is not always true. If $\epsilon$=0.1K, the functions will be called 90%-orthonormal. More generally, the functions will be called n %-orthonormal if $\epsilon$ is (100−n) % of K. For example, for 70%-orthonormality, $\epsilon$=0.3K.

The invention is not limited to the orthonormal or quasi-orthonormal CMF's or to any particular white color representation. For example, in some embodiments, the following color coordinate system ($S_1, S_2, S_3$) is used for color editing:

$$S_1 = \sqrt{X^2+Y^2+Z^2}$$

$$S_2 = X/S_1$$

$$S_3 = Z/S_1 \quad (26)$$

The XYZ tristimulus values in (26) can be replaced with linear RGB tristimulus values or with some other tristimulus values $T_1, T_2, T_3$, e.g.:

$$S_1 = \sqrt{X^2+Y^2+Z^2}$$

$$S_2 = T_2/S_1$$

$$S_3 T_3/S_1 \quad (27)$$

If $T_1$ can be negative, than the sign of $T_1$ can be provided in addition to the coordinates. Alternatively the sign of $T_1$ can be incorporated into one of the $S_1$, $S_2$, and/or $S_3$ values, for example:

$$S_1 = \text{Sign}(T_1) \times \sqrt{T_1^2+T_2^2+T_3^2} \quad (28)$$

The brightness editing can still be performed by multiplying the $S_1$ coordinate by k, with the $S_2$ and $S_3$ values being unchanged.

The BCH coordinate system can be constructed from linear systems other than DEF, including orthonormal and non-orthonormal, normalized and non-normalized systems. In some embodiments, a coordinate system is used with coordinates ($S_1, S_2, S_3$), where $S_1$ is defined as in (27) or (28), and the coordinates $S_2$ and $S_3$ are defined in a way similar to (19)-(23), e.g.:

$$S_2 = \cos^{-1}(T_1/B)$$

$$S_3 = \tan^{-1}(T_3/T_2) + \alpha \quad (29)$$

where $\alpha$ is as in (22), or $$S_3 = \text{arctg}(T_2, T_3) \quad (30)$$

In some embodiments, the value B is the square root of some other quadratic polynomial of in $T_1, T_2, T_3$:

$$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}, g_{22}, g_{33}, g_{12}, g_{13}, g_{23}$ are predefined constants, and $g_{11}, g_{22}, g_{33}$ are not equal to zero (e.g. $g_{11}, g_{22}, g_{33}$ are positive). Linear transforms result in different mathematical expressions of the coordinates without necessarily changing the values of the coordinates. For example, the coordinate system may use coordinates $S_1, S_2, S_3$ or their linear transform, wherein $S_1$ is defined by the value B, or $S_1$ is defined by B and the sign of a predefined function of one or more of $T_1, T_2, T_3$. In some embodiments $$B = \sqrt{\alpha_1^2(T_1, T_2, T_3) + \alpha_2^2(T_1, T_2, T_3) + \alpha_3^2(T_1, T_2, T_3)}$$

wherein $$\alpha_1(T_1, T_2, T_3) = \alpha_{11} \times T_1 + \alpha_{12} \times T_2 + \alpha_{13} \times T_3$$

$$\alpha_2(T_1, T_2, T_3) = \alpha_{21} \times T_1 + \alpha_{22} \times T_2 + \alpha_{23} \times T_3$$

$$\alpha_3(T_1, T_2, T_3) = \alpha_{31} \times T_1 + \alpha_{32} \times T_2 + \alpha_{33} \times T_3$$

wherein $\alpha_{11}, \alpha_{12}, \alpha_{13}, \alpha_{21}, \alpha_{22}, \alpha_{23}, \alpha_{31}, \alpha_{32}, \alpha_{33}$ are predefined numbers such that the following matrix $\Lambda$ is non-degenerate:

$$\Lambda = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

In some embodiments, the coordinate $S_1$ is defined by the value B and by a sign of a predefined function of one or more of $T_1, T_2, T_3$. The function can be one of $\alpha_1(T_1, T_2, T_3), \alpha_2(T_1, T_2, T_3), \alpha_3(T_1, T_2, T_3)$. Clearly, the values $T_1' = \alpha_1(T_1, T_2, T_3)$, $T_2' = \alpha_2(T_1, T_2, T_3)$, $T_3' = \alpha_3(T_1, T_2, T_3)$ are also tristimulus values. In some embodiments, the coordinate $S_2$ is defined by a value $\beta(T_1, T_2, T_3)/B$, wherein $$\beta(T_1, T_2, T_3) = \beta_1 \times T_1 + \beta_2 \times T_2 + \beta_3 \times T_3,$$

wherein $\beta_1, \beta_2, \beta_3$ are predefined numbers at least one of which is not equal to zero, or the coordinate $S_2$ is defined by the value $\beta(T_1, T_2, T_3)/B$ and the sign of a predefined function of one or more of $T_1, T_2, T_3$. The coordinate $S_3$ is defined by a value $\gamma(T_1, T_2, T_3)/B$, wherein $$\gamma(T_1, T_2, T_3) = \gamma_1 \times T_1 + \gamma_2 \times T_2 + \gamma_3 \times T_3,$$

wherein $\gamma_1, \gamma_2, \gamma_3$ are predefined numbers at least one of which is not equal to zero, and $\gamma(T_1, T_2, T_3)$ is not a multiple of $\beta(T_1, T_2, T_3)$, or the coordinate $S_3$ is defined by the value $\gamma(T_1, T_2, T_3)/B$ and the sign of a predefined function of one or more of $T_1, T_2, T_3$. In some embodiments, a value $\cos S_2$ is defined by a value $\beta(T_1, T_2, T_3)/B$, wherein $$\beta(T_1, T_2, T_3) = \beta_1 \times T_1 + \beta_2 \times T_2 + \beta_3 \times T_3,$$

wherein $\beta_1, \beta_2, \beta_3$ are predefined numbers at least one of which is not equal to zero, or the value $\cos S_2$ is defined by the value $\beta(T_1, T_2, T_3)/B$ and the sign of a predefined function of one or more of $T_1, T_2, T_3$. In some embodiments, a value $\tan S_3$ is defined by a value $\gamma(T_1, T_2, T_3)/\delta(T_1, T_2, T_3)$, wherein $$\gamma(T_1, T_2, T_3) = \gamma_1 \times T_1 + \gamma_2 \times T_2 + \gamma_3 \times T_3,$$

$$\delta(T_1, T_2, T_3) = \delta_1 \times T_1 + \delta_2 \times T_2 + \delta_3 \times T_3,$$

wherein $\Gamma_1, \gamma_2, \gamma_3$ are predefined numbers at least one of which is not equal to zero, and $\delta_2, \delta_3$ are predefined numbers at least one of which is not equal to zero, or the value $\tan S_3$ is defined by the value $\gamma(T_1, T_2, T_3)/\delta(T_1, T_2, T_3)$ and the sign of a predefined function of one or more of $T_1, T_2, T_3$. In some embodiments, $\beta(T_1, T_2, T_3)$ is one of $\alpha_1(T_1, T_2, T_3), \alpha_2(T_1, T_2, T_3), \alpha_3(T_1, T_2, T_3)$; $\gamma(T_1, T_2, T_3)$ is another one of $\alpha_1(T_1, T_2, T_3), \alpha_2(T_1, T_2, T_3), \alpha_3(T_1, T_2, T_3)$; and $\delta(T_1, T_2, T_3)$ is the third one of $\alpha_1(T_1, T_2, T_3), \alpha_2(T_1, T_2, T_3), \alpha_3(T_1, T_2, T_3)$. In some embodiments, any color whose tristimulus values $T_1, T_2, T_3$ are such that $\alpha_1(T_1, T_2, T_3)$ is not zero and $\alpha_2(T_1, T_2, T_3) = \alpha_3(T_1, T_2, T_3) = 0$, is a white or a shade of gray. This can be $D_{65}$ or some other white color. In some embodiments, a monochromatic red color of a predefined wavelength has tristimulus values $T_1$, $T_2$, $T_3$ such that $\alpha_2(T_1, T_2, T_3)$ is positive and $\alpha_3(T_1, T_2, T_3)=0$. In some embodiments, $\alpha_1(T_1, T_2, T_3)$, $\alpha_2(T_1, T_2, T_3)$, $\alpha_3(T_1, T_2, T_3)$ are tristimulus values corresponding to 70%-orthonormal color matching functions. In some embodiments, up to a constant multiple, $\Lambda$ is an orthonormal matrix, i.e. $\Lambda\Lambda^T=I$, where $\Lambda^T$ is a transpose of $\Lambda$, and I is the identity matrix, i.e.

$$I = \begin{bmatrix} 1 & 0 & 0 \\ 0 & 1 & 0 \\ 0 & 0 & 1 \end{bmatrix}$$

We will also call the matrix orthonormal if $\Lambda\Lambda^T=c\times I$ where c is a non-zero number. If the elements of $\Lambda\Lambda^T$ are each within $c\times n/100$ of the respective elements of a matrix $c\times I$ for some c and n, then the matrix $\Lambda$ will be called (100-n) %-orthonormal. For example, if the elements of $\Lambda\Lambda^T$ are each within $0.3\times c$ of the respective elements of a matrix $c\times I$ (i.e. for each element $\lambda_{i,j}$ of matrix $\Lambda\Lambda^T$, $|\lambda_{i,j}-e_{i,j}|\leq 0.3\times c$ where $e_{i,j}$ is the corresponding element of the matrix $c\times I$), the matrix $\Lambda$ will be called 70%-orthonormal. In some embodiments, the matrix $\Lambda$ is 70% or more percent orthonormal (e.g. 90%-orthonormal).

The tristimulus values $T_1$, $T_2$, $T_3$, or the corresponding color matching functions, do not have to be normalized in any way. In some prior art systems, the color matching functions are normalized to require that the integral of each color matching function be equal to 1. In the XYZ system of FIG. 2, there is a normalizing condition X=Y=Z for a pre-defined, standard white color with a constant spectral power distribution function $P(\lambda)$. The invention is not limited by any such requirements.

Compact Representation of Images

The Bef and BCH coordinate systems are convenient for image editing, but it is desirable to represent the image in a more compact form for storage or network transmission. Compact representation may involve image degradation, and it is desirable to reduce or avoid image degradation.

In some embodiments, a compact representation is generated as shown in FIG. 4. The Bef data are coded at step 410 using a logarithmic function in a manner described in more detail below. Then some transform is performed at step 420 to improve the compression ratio at step 430. Transform examples include decorrelation transforms (e.g. discrete wavelet transform, or DWT) that separate low frequency and high frequency components. Further compression (e.g. run/length, entropy coding, or adaptive dictionary coding) is performed at step 430. Finally, the image is stored and/or transmitted over a network at step 440. Not all of these operations are performed in all the embodiments, and additional operations may be performed.

In order to edit or display the image processed by the method of FIG. 4, the sequence is reversed (FIG. 5). The image data are read from storage or received over a network (step 510), then decompressed (step 520) to reverse the operation 430, then an inverse transform is performed (step 530) to reverse the operation 420, and finally the Bef data are reconstructed (exponential/linear processing at step 540) to reverse the logarithmic/linear coding of step 410. (The Bef data may or may not be perfectly reconstructed.) The image is then edited and/or displayed as desired.

Advantageously, if the steps 420, 430 are lossless, then the only loss of information may occur at step 410. Error control at step 410 is therefore sufficient to control the image degradation.

In some embodiments, the e and f components are represented in integer format (i.e. fixed point format) at the output of step 410. The integer format is desirable for decorrelation step 420 because some decorrelation methods (e.g. DWT) are computationally intensive, and integer arithmetic is faster than floating point arithmetic on many computer processors. Therefore, in some embodiments, the e and f processing of step 410 consists in representing the e and f coordinates in integer format in a desired number of bits. If e, f were in floating point format (i.e. with a separate representation of the exponent and the mantissa) at the input of step 410, they are converted to the desired integer format at step 410. If they were in integer format at the input of step 410, they may be truncated or otherwise processed as needed to obtain the desired number of bits. The maximum error (maximum $\Delta e$ or $\Delta f$) is then defined by the number of bits in the final representation (for example, if 12 bits are used, then the maximum error is $\frac{1}{2}^{12}$). The maximum error defines the maximum distortion of the hue and saturation parameters.

For the brightness, the maximum error $\Delta B$ characterizes the maximum brightness distortion only in dim image areas. Past studies indicate that human ability to differentiate between different brightness values $I_1$ and $I_2$ (where $I_1$ and $I_2$ are prior representations of brightness) can be characterized by $\Delta I=|I_1-I_2|$ only in dim areas. For brighter areas, including most of the visible brightness range, a good measure of the human ability to differentiate between $I_1$ and $I_2$ is the value $$\Delta I/I \tag{31}$$

where I is some value in the range $[I_1, I_2]$, e.g. $I=I_1$. (Here each brightness value I, $I_1$, $I_2$ can represent the brightness average over some area.) If the value (31) is below 0.5%, people cannot see the difference between $I_1$ and $I_2$, so no image degradation occurs if brightness is changed from $I_1$ to $I_2$ during image processing. As the value (31) increases, more and more people will see the difference. A 2% value of (31) is noticeable to most people.

The B coordinate is a good brightness representation, so the maximum image degradation can be specified by the maximum $\Delta B$ for low B values and by the maximum of $$\Delta B/B \tag{32}$$

for higher B values. Therefore, if the maximum error $\Delta B$ were constant throughout the brightness range to achieve low image degradation both for low and high brightness values, the parameter (32) would be very small for large B, resulting in unnecessary brightness information in the image and hence in less than optimal data size and more intensive computation at steps 420, 430.

In order to obtain a more uniform value (32), some embodiments of the present invention perform logarithmic encoding of the B coordinate at step 410, or a combination of the logarithmic encoding for higher B values and some other encoding (e.g. linear) for lower B values. The B coordinate is converted to a value V (FIG. 6), which is represented in integer format in a desired number of bits in some embodiments. The maximum error $\Delta V$ is defined by the number of bits (plus any errors of the logarithm computation), and hence is approximately constant. The V values are chosen so that the maximum error $\Delta B$ increases with B, and the value (32) remains approximately constant.

More particularly, let $V_1, V_2, \ldots, V_N$ be all the possible V values allowed at the output of step 410. Suppose, for example, that $V_n=n$. The maximum error $\Delta V=1$, and hence is constant. Let $B_1, B_2, \ldots B_N$ be the corresponding B values.

Let $c_n = B_{n+1}/B_n$. In each interval $[B_n, B_{n+1})$, the value (32) has the following maximum:

$$(B_{n+1} - B_n)/B_n = c_n - 1 \quad (33)$$

Therefore, (32) is constant (independent of n) if, and only if, $c_n$ is constant. Using c to denote the common value of $c_n$, we have:

$$B_n = B_{n_{00}} * c^{n-n_0} \quad (34)$$

where $n_0$ is some starting value of n in the range in which the human perception corresponds to (32). Since $V_n = n$, the equation (34) implies that $$V_n = n_0 + \log_c(B_n/B_{n_0}) \quad (35)$$

The logarithm can be taken to any base, not necessarily c. Changing the base corresponds to multiplying the logarithm by some constant. The base can be any positive number other than 1. Also, the expression (35) can be multiplied by some constant to scale $V_n$ to a desired range (e.g. the range [0,1]). Further, some offset (denoted $k_3$ in (36) below) can be added to $B_n/B_{n_0}$ to avoid computing the logarithm of very small numbers. Thus, in some embodiments, $$V_n = k_1 * \log_b(k_2 * B_n + k_3) + k_4 \quad (36)$$

where $k_1, k_2, k_3, k_4$, b are predefined constants. The inverse computation is given by:

$$B_n = [b^{(V_n - k_4)/k_1} - k_3]/k_2 \quad (37)$$

In some embodiments, for $n < n_0$, a linear scheme is used (like for e and f), for example, $V_n = B_n$, or:

$$V_n = k_5 * B_n + k_6 \quad (38)$$

where $k_5, k_6$ are predefined constants, and $k_5$ is not zero. The inverse computation is:

$$B_n = (V_n - k_6)/k_5 \quad (39)$$

In some embodiments, $k_6 = 0$.

An appropriate value $B_{n_0}$ (the boundary between the linear range (36) and the logarithmic range (35)) can be chosen in different ways. Some studies indicate that the human visual perception changes from "linear" (when the threshold human ability to see brightness changes is characterized by $\Delta I$) to "logarithmic" (when the ability to see brightness changes is characterized by $\Delta I/I$) at a brightness level at which physical adaptation of the eye becomes noticeable (e.g. the iris starts to constrict). This level is believed to be about 1 cd/m². Different $B_{n_0}$ values may be appropriate for different spectral compositions of the image. (The spectral composition can be defined, for example, by the radiance $P(\lambda)$.) The invention is not limited to any particular $B_{n_0}$ value, or any model of human visual perception, or the validity of any study referred to herein. The appropriate $B_{n_0}$ value may also depend on future use of the image. For example, suppose the image is generated by an image capture device, such as a photographic or movie camera, as the camera takes a picture of a dark, dim scene (e.g. at night). Eventually, after the image processing of FIGS. 4 and 5, the image will be displayed on a monitor, and in order to see the image well, the monitor's user will probably have to set the monitor brightness to a large level (using the monitor's brightness control, e.g. a manual control). Suppose that in order to see the image well, the monitor will have to increase the image brightness B by a factor of 1000. In this case, at step 410, it may be desirable to set the threshold $B_{n_0}$ to 1/1000 of the value used for normal lighting, e.g. $B_{n_0} = 1/1000$ cd/m². Conversely, if the image is very bright (e.g. includes the sun), it may be desirable to set $B_{n_0}$ to a high value if the monitor brightness is likely to be lowered by the user. Some embodiments allow $B_{n_0}$ to be set by an operator of the image capture device or of a computer performing the step 410.

For illustration, in one embodiment, $B_{n_0} = 1$ cd/m². The value $c = 128/127$, and $n_0 = 127$, so:

$$B_n = B_{127} * (128/127)^{n-127} \text{ for } n \geq 127,$$

$$B_n = n * B_{127}/127 \text{ for } n < 127$$

Hence, $$V_n = n = \log_b(B_n/B_{127})/\log_b(128/127) + 127 \text{ for } B_{n_0} \geq B_{127}$$

$$V_n = 127 * B_n/B_{127} \text{ for } B_{n_0} < B_{127}$$

Of note, $B_n$ is a continuous function of n (including at $n = n_0$). In some embodiments, $B_n$ is also differentiable, and in particular differentiable at $n_0$. This is equivalent to V being differentiable with respect to B (unless dB/dn=0). From (36) and (38), $$dV/dB = k_0 = k_1 * k_2/(k_2 * B_{n_0} + k_3) * \ln b$$

The logarithmic expression (36) can also be derived by noting that (32) is equal to $$1/B * dB/dV * \Delta V = d(\ln B)/dV * \Delta V$$

and therefore if $\Delta V$ is constant, then for (32) to be constant the function $\ln B$ must be linear in V.

Thus, in some embodiments, step 410 outputs each of the coordinates V, e, f, in integer format in a predefined number of bits. The number of bits may be different for different coordinates. If B was in floating point format, the logarithmic expression (36) can be computed in floating point format, and the result converted to integer format. Suitable rounding can be performed, such as rounding up, down, or to the nearest $V_n$ value. In some embodiments, B is converted to integer format before the logarithm computation. In another variation, the computer system performing the step 410 determines the values $B_n, B_{n+1}$ such that B is in an interval with end points $B_n, B_{n+1}$, e.g. in $[B_i, B_{i+1}]$ or $(B_i, B_{i+1}]$. Once the interval is found, the corresponding V value is set to a predefined value in the interval $[V_n, V_{n+1}]$, e.g. to $V_n$ or $V_{n+1}$ or some midpoint in this interval. Other computational schemes, known or to be invented, can also be used.

At step 420, a transform is performed which is likely to increase the compression ratio at step 430 as noted above. An example is the discrete wavelet transform (DWT). DWT applies a number of filters (a filter bank) to special data (i.e. to data defined for each pixel, such as V, e or f) to hopefully separate components in different frequency bands. For example, a bank consisting of a half band highpass filter H and a half band lowpass filter L can be used. For convenience, let us label the pixels as in FIG. 7, with a pixel (i,j) being in row i and column j. Then a one dimensional DWT can be performed in each row on one or more of values V, e, f in the row. The explanation below is for the V coordinate, but applies equally to the e and f coordinates. It will be assumed for ease of explanation that the V coordinates are arranged in a two-dimensional memory array labeled as the corresponding pixels in FIG. 7, i.e. V(i,j) is the V coordinate at pixel (i,j). An array memory structure is not necessary, and the invention is not limited to any particular data arrangement in the computer memory.

The filters L and H are applied to the V coordinate in each row of the array, and the results can be stored in the same or another array or another data structure. In each row, the low frequency coefficients (the L filter output) can be stored in the left half of each row, and the high frequency coefficients (the H filter output) in the right half of each row, as shown in FIG.

8. The DWT can be performed again on the left and/or right half of each row. Alternatively, a two-dimensional DWT can be performed. In this case, after obtaining the structure of FIG. 8, a one-dimensional DWT is performed on each column (FIG. 9). In each column, the low frequency coefficients (shown as LL for the left half of the array of FIG. 8 and as LH for the right half of the array) are stored in the top half of the column, and the high frequency coefficients (HL for the left half of the array of FIG. 8 and HH for the right half) are stored in the bottom half of each column. The DWT can be repeated on at least the LL part of the structure of FIG. 9, and possibly on any one or more of the LH HL, and HH parts, with the same or different set of filters. Different filter banks can be used for the row-wise and column-wise DWT applications (i.e. the L and H filters used to obtain the structure of FIG. 9 can be different from those used to obtain the structure of FIG. 8).

In some DWT implementations, the output of the lowpass filter L for each row i consists of the even values V(i,2j), i.e. in the matrix of FIG. 8

$$L(i,j)=V(i,2j), j=0, 1, \ldots m/2-1$$

where m is the number of columns in each of the arrays of FIGS. 7-9 (these arrays have the same dimensions; in this example, m is even, but this is not necessary for the invention). The highpass filter H outputs the difference between the odd-pixel values V(i, 2j−1) and a predicted value P(i,2j−1) which is computed based on the even-pixel values:

$$H(i,j)=V(i,2j-m+1)-P(i,2j-m+1), j=m/2, m/2+1, \ldots, m-1$$

In some embodiments, the predictor function P is the mean of the V values at the adjacent even pixels:

$$P(i,2j-m+1)=(V(i,2j-m)+V(i,2j-m+2))/2$$

(V is extended in some way at the array boundary so that P(i,m−1) is defined). In other embodiments, P is a value of a polynomial which equals to the V values on a number of adjacent even pixels. For example, for a cubic polynomial:

$$P(i,2j-m+1)=(-V(i,2j-m-2)+9V(i,2j-m)+9V(i,2j-m+2)-V(i,2j-m+3))/16$$

In some embodiments, different predictors P are used for the same image depending on the image properties at a pixel (e.g. depending on whether or not an object edge is detected near the pixel). See e.g. U.S. Pat. No. 6,941,331 issued Sep. 6, 2005 to Bezryadin et al., incorporated herein by reference. In some embodiments, the same filters L and H are used for the column DWT (FIG. 9).

Another possible transform for step 420 uses a prediction, at each pixel, based on the values of one or more preceding pixels, e.g.:

$$P(i,j)=V(i,j-1), j=1, 2, \ldots m-1.$$

The transform outputs the value V(i, 0) for the 0-th pixel in each row, and V(i,j)−V(i,j−1) for each subsequent pixel in the row.

Other possible transforms include discrete Fourier transform (DFT), discrete cosine transform (DCT), or others. DFT, DCT, and some other suitable transforms are described, for example, in William K. Pratt, *Digital Image Processing* (3$^{rd}$ Ed. 2001), pages 189-210, incorporated herein by reference.

The techniques described above in connection with FIGS. 4-9 for the Bef coordinate system can be applied to the BCH coordinate system, with the coordinates C and H processed as described above for e and f. Other coordinate systems can also be used.

In some embodiments, all the data manipulations can be performed by one or more computer systems such a system 1010 in FIG. 10. The computer system may include one or more computer processors 1012, storage 1014 (including possibly magnetic, optical, semiconductor, and/or other types of storage, known or to be invented). If data display is desired, the system may include one or more display devices 1016 (e.g. a monitor, a printer, or some other type, known or to be invented). If a network connection is desired, network interface 1017 can be provided. Image data and computer programs manipulating the data (such as programs that perform the methods described above in connection with FIGS. 3-9) can be stored in storage 1014 and/or transmitted over a network.

As described above, some embodiments of the present invention provide a method comprising: (1) obtaining digital data for one or more image portions $p_1, p_2, \ldots$ (e.g. one or more pixels), wherein for each image portion p ($p=p_1, p_2, \ldots$), the digital data represent at least one coordinate $S_1$ (e.g. $S_1=B$) of a color S(p) of the portion p in a first coordinate system e.g. Bef or BCH), wherein for a color S having tristimulus values $T_1, T_2, T_3$ in a second coordinate system (e.g. tristimulus values DEF): (1A) the coordinate $S_1$ is defined by a B value $$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}, g_{22}, g_{33}, g_{12}, g_{13}, g_{23}$ are predefined constants, and $g_{11}, g_{22}, g_{33}$ are not equal to zero, or (1B) the coordinate $S_1$ is defined by the B value and by a sign of a predefined function of one or more of $T_1, T_2, T_3$. The B value can be the same as in Bef or BCH, or it can be twice the value of the B coordinate in Bef, or some other value. The method further comprises: (2) processing the digital data to determine one or more V-values each of which represents a color property (e.g. brightness) of the corresponding image portion, the processing comprising, for at least one B value, determining the corresponding V value as in (36). In some embodiments, each V-value is a value represented in integer format.

Some embodiments use a combination of logarithmic coding (36) and some other coding, e.g. linear coding (38), depending on the B coordinate. The logarithmic coding may or may not be used depending on the image; for example, in the embodiment of FIG. 6, if all the B values are below $B_{n_0}$, then only the linear coding (38) is used. The method comprises determining a range to which the B coordinate belongs, and performing (36) only if the B coordinate is in a predefined proper range (e.g. $B_{n_0} \leq B < \infty$).

In some embodiments, the V-values are computed as follows. Given a B value, a B-interval is determined containing the B value. The B-intervals constitute a predefined first plurality of B-intervals, such as intervals $[B_n, B_{n+1})$ in the logarithmic range $n > n_0$ in FIG. 6 (or $n > n_0$), or intervals $(B_n, B_{n+1}]$, i.e. including $B_{n+1}$ but not B. Denoting a B-interval's ends as $B_{e1}, B_{e2}$ (e.g. $B_{e1}=B_n$ and $B_{e2}=B_{n+1}$), each B-interval is either $(B_{e1}, B_{e2})$, or $[B_{e1}, B_{e2})$, or $(B_{e1}, B_{e2}]$, or $[B_{e1}, B_{e2}]$. No two of these intervals share an internal point, i.e. a point having a neighborhood in both intervals. In other words, the intersection of any two of these intervals may be empty or may consist of a single endpoint. The intervals are such that one or both of the following conditions (1), (2) hold:

(1) for each B-interval in the first plurality of the B-intervals, a corresponding first ratio $\delta_1=\Delta B/B'$, where B' is a selected value in the B-interval, and/or $B'=B_{e1}$ or $B'=B_{e2}$, deviates by at most 30% from the first ratios' mean value over the first plurality of the B-intervals, i.e.

$$0.7\delta_{1m} \leq \delta_1 \leq 1.3\delta_{1m}$$

where $\delta_{1m}$ is the mean of $\delta_1$ over the first plurality of the B-intervals;

(2) for each B-interval in the first plurality of the B-intervals, a corresponding second ratio $\delta_2 = B_{e2}/B_{e1}$ deviates by at most 30% from the second ratios' mean value over the first plurality of the B-intervals.

When the B-interval is determined, the corresponding V value is determined as one of a predefined plurality of first V-values. For example, if the B-interval is [$B_n$, $B_{n+1}$), the corresponding first V value may be $V_n$ or some other predefined value in [$V_n$, $V_{n+1}$). Each first V-value is in one of a predefined first plurality of V-intervals, e.g. intervals [$V_n$, $V_{n+1}$) with n>$n_0$, or intervals ($V_n$, $V_{n+1}$], or ($V_n$, $V_{n+1}$), or [$V_n$, $V_{n+1}$]. For each V-interval in the first plurality of the V-intervals, the V-interval's length $\Delta V$ deviates by at most 30% from a mean value of $\Delta V$ over the first plurality of the V-intervals.

The maximum deviation values can be other than 30% for the B-intervals and/or for the V-intervals, for example, 20%, 10%, 5%, and other values are suitable. In particular, any values of 30% and below are suitable. The deviation values do not have to be the same for the B-intervals and the V-intervals.

Some embodiments use different pluralities of intervals in different ranges of B, e.g. for logarithmic and linear coding respectively. For example, for the linear coding, the B-intervals are such that the length $\Delta B$ deviates by at most 30% from a mean value of $\Delta B$ over the second plurality of the B-intervals. Also, the length $\Delta V$ deviates by at most 30% from a mean value of $\Delta V$ over the second plurality of the V-intervals. The length $\Delta V$ does not have to be the same for n<$n_0$ and for n>$n_0$.

In some embodiments, the logarithmic coding range does not include all the $B_n$ values with n>$n_0$. The logarithmic coding range may be, for example, just 10% of the range [0, $B_{max}$] where $B_{max}$ is some maximum value for which the processing of FIG. 4 or 5 is performed, or the maximum of the B values in the image. In other portions of the range n>$n_0$, some other coding is performed, which may be non-logarithmic, or may be logarithmic but with some other parameters $k_1$ through $k_4$ and b. Thus, different parameters can be used in different ranges. Also, the logarithmic coding range may be just 10% of the range [$B_{n_0}$, $B_{max}$], while non-logarithmic coding or logarithmic coding with different parameters can be performed elsewhere. In these cases, the 10% figure is exemplary, and other percentages are possible, including any larger percentages.

In some embodiments, the logarithmic coding range for the V-values does not include all of [$V_{n_0}$, $V_{max}$]. The logarithmic coding range may be just 10% of the range [0, $V_{max}$] or [$V_{n_0}$, $V_{max}$], where $V_{max}$ is some maximum value for which the processing of FIG. 4 or 5 is performed, or the maximum of the V values in the image. For example, the number of points $B_n$ or $V_n$ in the logarithmic coding range can be just 10% of the total number of points $B_n$ or $V_n$, or the total number of such points in the range n>$n_0$ or n≧$n_0$. Here $V_{max}$ is some maximum V value for which the processing of FIG. 4 or 5 is performed, or the maximum of the V values in the image. In other portions of the range [0, $V_{max}$] or [$V_{n_0}$, $V_{max}$], non-logarithmic coding is performed, or logarithmic coding is performed with different parameters. The 10% figure is exemplary, and other percentages are possible, including any larger percentages.

The same range choices apply to the exponential coding (37), as the invention includes determining the B values from the V values.

The invention is not limited to the two-dimensional images (as in FIG. 7). The invention is applicable to pixel (bitmap) images and to vector graphics. Colors can be specified separately for each pixel, or a color can be specified for an entire object or some other image portion. The invention is applicable to monochromatic images, in which the chromatic coordinates (such as e, f or C, H) are not specified or are the same for all the pixels. Other embodiments and variations are within the scope of the invention, as defined by the appended claims.

APPENDIX 1-FUNCTION arctg(a, b)

Here is a pseudocode written in a C-like language (C is a programming language).

```
inline float arctg(const float a, const float b)
{
    float res;
    if( FLT_EPSILON * abs(b) < abs(a) )
        //FLT_EPSILON is the minimum positive number ε
        // such that 1-ε is different from 1 on the computer.
        //abs( ) is the absolute value
    {
        res = tan⁻¹ (b / a) ;
        if (a < 0)
        {
            res += π ;
        }
        else if (b < 0)
        {
            res += 2 π ;
        };
    }
    else
    {
        if(b < 0)
        {
            res = 3/2 π ;
        }
        else
        {
            if (b > 0)
            {
                res = ½ π ;
            }
            else
            {
                res = 0 ;
            };
        };
    };
    return res ;
} ;
```

The invention claimed is:

1. A circuitry-implemented method for image processing, the method comprising:

(1) obtaining digital data representing a V value for each of one or more image portions $p_1$, $p_2$, each V value representing a color property of the respective image portion, wherein each image portion p (p=$p_1$, $p_2$, . . . ) has a color S(p) having a coordinate $S_1$ in a first coordinate system, wherein for a color S having tristimulus values $T_1$, $T_2$, $T_3$ in a second coordinate system:

(1A) the coordinate $S_1$ is defined by a B value $$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}$, $g_{22}$, $g_{33}$, $g_{12}$, $g_{13}$, $g_{23}$ are predefined constants, and $g_{11}$, $g_{22}$, $g_{33}$ are not equal to zero, or (1B) the coordinate $S_1$ is defined by the B value and by a sign of a predefined function of one or more of $T_1$, $T_2$, $T_3$;

(2) processing the digital data to obtain the coordinate $S_1$ for each said image portion, wherein for each V value in a first range of values, the corresponding coordinate $S_1$ corresponds to the B value of:

$$B=[b^{(V-k_4)/k_1}-k_3]/k_2$$

wherein $k_1, k_2, k_3, k_4, b$ are predefined constants, $k_2$ and $k_3$ are not zero, and b is positive and not equal to one.

2. A circuitry-implemented method for image processing, the method comprising:
(1) obtaining digital data containing a V value for each of one or more image portions $p_1, p_2, \ldots$, each V value representing a color property of the respective image portion, wherein each image portion p ($p=p_1, p_2, \ldots$) has a color S(p) have a coordinate $S_1$ in a first coordinate system, wherein for a color S having tristimulus values $T_1, T_2, T_3$ in a second coordinate system:
(1A) the coordinate $S_1$ is defined by a B value $$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}, g_{22}, g_{33}, g_{12}, g_{13}, g_{23}$ are predefined constants, and $g_{11}, g_{22}, g_{33}$ are not equal to zero, or
(1B) the coordinate $S_1$ is defined by the B value and by a sign of a predefined function of one or more of $T_1, T_2, T_3$;
(2) processing the digital data to obtain the coordinate $S_1$ for each said image portion, wherein the processing comprises, for at least one image portion, determining a range to which the corresponding V value belongs, the range being one of a predefined plurality of ranges, and if the V value is in a first range which is one of said ranges, then obtaining the corresponding coordinate $S_1$ for which the corresponding B value is:

$$B=[b^{(V-k_4)/k_1}-k_3]/k_2$$

wherein $k_1, k_2, k_3, k_4, b$ are predefined constants, $k_2$ and $k_3$ are not zero, and b is positive and not equal to one.

3. The method of claim 2 wherein the first range has a length equal to at least 10% of a combined length of all the ranges.

4. The method of claim 2 wherein the method comprises, if the V value is not in the first range but is in a second range which is one of said ranges and which contains values which are smaller than values in the first range, obtaining the coordinate $S_1$ for which the corresponding B value is:

$$B=(V-k_6)/k_5$$

where $k_5, k_6$ are predefined constants, and $k_5$ is not zero.

5. The method of claim 4 wherein the first range has a length equal to at least 10% of a combined length of all the ranges other than the second range.

6. Circuitry adapted to perform the method of claim 1.

7. A non-transitory computer readable medium comprising one or more computer instructions for causing a computer system to perform the method of claim 1.

8. A network transmission method comprising transmitting over a network a computer program for performing the method of claim 1.

9. Circuitry adapted to perform the method of claim 2.

10. A non-transitory computer readable medium comprising one or more computer instructions for causing a computer system to perform the method of claim 2.

11. A network transmission method comprising transmitting over a network a computer program for performing the method of claim 2.

12. Circuitry adapted to perform the method of claim 3.

13. A non-transitory computer readable medium comprising one or more computer instructions for causing a computer system to perform the method of claim 3.

14. A network transmission method comprising transmitting over a network a computer program for performing the method of claim 3.

15. Circuitry adapted to perform the method of claim 4.

16. A non-transitory computer readable medium comprising one or more computer instructions for causing a computer system to perform the method of claim 4.

17. A network transmission method comprising transmitting over a network a computer program for performing the method of claim 4.

18. Circuitry adapted to perform the method of claim 5.

19. A non-transitory computer readable medium comprising one or more computer instructions for causing a computer system to perform the method of claim 5.

20. A network transmission method comprising transmitting over a network a computer program for performing the method of claim 5.

* * * * *